(12) United States Patent
Laing et al.

(10) Patent No.: US 10,949,287 B2
(45) Date of Patent: Mar. 16, 2021

(54) FINDING, TROUBLESHOOTING AND AUTO-REMEDIATING PROBLEMS IN ACTIVE STORAGE ENVIRONMENTS

(71) Applicant: INTERNATIONAL BUSINESS MACHINES CORPORATION, Armonk, NY (US)

(72) Inventors: Donald Charles Laing, Midland, TX (US); John J. Auvenshine, Tucson, AZ (US); Michael L. Camarco, III, Brookfield, CT (US); Dominic Thibodeau, Laval (CA); Per Lutkemeyer, Lystrup (DK)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 16/135,763

(22) Filed: Sep. 19, 2018

(65) Prior Publication Data

US 2020/0089561 A1  Mar. 19, 2020

(51) Int. Cl.
*G06F 11/00*  (2006.01)
*G06F 11/07*  (2006.01)
(Continued)

(52) U.S. Cl.
CPC ........ *G06F 11/0793* (2013.01); *G06F 11/079* (2013.01); *G06F 11/0727* (2013.01);
(Continued)

(58) Field of Classification Search
CPC ............. G06F 11/0793; G06F 11/0727; G06F 11/079; G06F 16/3329; G06N 5/02
See application file for complete search history.

(56) References Cited

U.S. PATENT DOCUMENTS 6,370,542 B1  4/2002  Kenyon
7,519,568 B2 *  4/2009  Wright ................... G06Q 10/06
                                                706/47
(Continued)

FOREIGN PATENT DOCUMENTS

JP  2008165822 A  7/2008

OTHER PUBLICATIONS

"Storage Networking Problem Determination," IBM, et al., An IP.com Prior Art Database Technical Disclosure, No. IPCOM000022539D, 3 pages. Mar. 20, 2004.

*Primary Examiner* — Jonathan D Gibson
(74) *Attorney, Agent, or Firm* — Maeve M. Carpender, Esq.; Wayne F. Reinke, Esq.; Heslin Rothenberg Farley & Mesiti P.C.

(57) ABSTRACT

Disclosed is a computer-implemented method of finding, troubleshooting and auto-remediating problems in storage environments. The method includes guiding a user, by a data processing system of an active storage environment, to select an applicable playbook of troubleshooting logic from among playbooks of different troubleshooting logic to address problem(s) with infrastructure device(s) of the active storage environment, asking the user, by the data processing system, questions from the applicable playbook to identify a possible resolution path for the problem(s), resulting in an identified resolution path, receiving, by the data processing system, answers to the questions from the user, obtaining, by the data processing system, cross-domain information regarding infrastructure device(s) potentially relevant to the problem(s), resulting in obtained cross-domain information, cognitively determining, by the data processing system, possible resolution(s) based on the answers and the obtained cross-domain information, and (Continued)

auto-remediating, by the data processing system, the problem(s).

20 Claims, 13 Drawing Sheets

(51) Int. Cl.
  *G06N 5/02* (2006.01)
  *G06F 16/332* (2019.01)
  *H04L 29/08* (2006.01)
(52) U.S. Cl.
  CPC .......... *G06F 16/3329* (2019.01); *G06N 5/02* (2013.01); *H04L 67/1097* (2013.01)

(56) References Cited

U.S. PATENT DOCUMENTS

| | | | |
|---|---|---|---|
| 7,890,318 B2 * | 2/2011 | Castellani | G06F 11/0733 704/9 |
| 8,161,325 B2 * | 4/2012 | Caiman | G06F 11/079 714/26 |
| 8,312,130 B2 | 11/2012 | Jibbe | |
| 8,341,251 B2 | 12/2012 | Gao et al. | |
| 8,635,376 B2 | 1/2014 | Barrett et al. | |
| 8,996,397 B2 * | 3/2015 | Grace | G06Q 10/063114 705/7.39 |
| 10,387,899 B2 * | 8/2019 | Fighel | H04L 41/064 |
| 10,636,038 B2 * | 4/2020 | Cheng | G06N 5/02 |
| 2006/0229846 A1 * | 10/2006 | Wright | G06Q 10/06 702/182 |
| 2008/0294423 A1 * | 11/2008 | Castellani | G06F 11/0793 704/4 |
| 2009/0035732 A1 * | 2/2009 | Kanagalingam | G09B 19/0053 434/118 |
| 2015/0193720 A1 * | 7/2015 | Uthra | G06Q 10/063112 705/7.14 |
| 2016/0088083 A1 | 3/2016 | Bharadwaj et al. | |
| 2016/0253254 A1 * | 9/2016 | Krishnan | G06F 11/0709 717/124 |
| 2018/0114234 A1 * | 4/2018 | Fighel | G06F 11/3409 |
| 2018/0115464 A1 * | 4/2018 | Fighel | H04L 41/0654 |
| 2018/0121929 A1 * | 5/2018 | Cheng | G06Q 30/016 |
| 2018/0337943 A1 * | 11/2018 | Arnell | H04L 41/08 |
| 2019/0104137 A1 * | 4/2019 | Hailpern | H04L 63/1408 |
| 2019/0108086 A1 * | 4/2019 | Yu | G06F 11/0748 |
| 2019/0268354 A1 * | 8/2019 | Zettel, II | H04L 63/1416 |

* cited by examiner

FINDING, TROUBLESHOOTING AND AUTO-REMEDIATING PROBLEMS IN ACTIVE STORAGE ENVIRONMENTS

BACKGROUND

One or more aspects of this disclosure relate, in general, to troubleshooting problems in computer environments. In particular, one or more aspects of the disclosure relate to finding, troubleshooting and auto-remediating problems with infrastructure devices in active storage environments.

Storage virtualization engines are complex devices with both many internal components and many external relationships. These are all subject to failure. When the device is not performing as expected (or at all), resolving problems, in a timely manner, with the device can be difficult.

Also, problems can happen at any time of the day or night. The best expert may not be available to solve the problem or may not be at his or her best when it happens due to sleep, illness, or vacation.

SUMMARY

Shortcomings of the prior art are overcome and additional advantages are provided through the provision, in one aspect, of a computer-implemented method of finding, troubleshooting and auto-remediating problems in storage environments. The method includes guiding a user, by a data processing system of an active storage environment, to select an applicable playbook of troubleshooting logic from among a plurality of playbooks of different troubleshooting logic to address one or more problems with one or more infrastructure devices of the active storage environment, asking the user, by the data processing system, a plurality of questions from the applicable playbook to identify a possible resolution path for the one or more problems, resulting in an identified resolution path, receiving, by the data processing system, a plurality of answers to the plurality of questions from the user, obtaining, by the data processing system, cross-domain information regarding one or more infrastructure devices potentially relevant to the one or more problems, resulting in obtained cross-domain information, cognitively determining, by the data processing system, one or more possible resolutions based on the plurality of answers and the obtained cross-domain information, and auto-remediating the one or more problems.

In another aspect, a system for finding, troubleshooting and auto-remediating problems in storage environments may be provided. The system may include, for example, memory(ies), at least one processor in communication with the memory(ies). Further, the system may include program instructions executable by the one or more processor via the memory to perform a method. The method may include, for example, guiding a user, by a data processing system of an active storage environment, to select an applicable playbook of troubleshooting logic from among a plurality of playbooks of different troubleshooting logic to address one or more problems with one or more infrastructure devices of the active storage environment, asking the user, by the data processing system, a plurality of questions from the applicable playbook to identify a possible resolution path for the one or more problems, resulting in an identified resolution path, receiving, by the data processing system, a plurality of answers to the plurality of questions from the user, obtaining, by the data processing system, cross-domain information regarding one or more infrastructure devices potentially relevant to the one or more problems, resulting in obtained cross-domain information, cognitively determining, by the data processing system, one or more possible resolutions based on the plurality of answers and the obtained cross-domain information, and auto-remediating the one or more problems.

In a further aspect, a computer program product may be provided. The computer program product may include a non-transitory storage medium readable by a processor and storing instructions for performing a method. The method may include, for example, guiding a user, by a data processing system of an active storage environment, to select an applicable playbook of troubleshooting logic from among a plurality of playbooks of different troubleshooting logic to address one or more problems with one or more infrastructure devices of the active storage environment, asking the user, by the data processing system, a plurality of questions from the applicable playbook to identify a possible resolution path for the one or more problems, resulting in an identified resolution path, receiving, by the data processing system, a plurality of answers to the plurality of questions from the user, obtaining, by the data processing system, cross-domain information regarding one or more infrastructure devices potentially relevant to the one or more problems, resulting in obtained cross-domain information, cognitively determining, by the data processing system, one or more possible resolutions based on the plurality of answers and the obtained cross-domain information, and auto-remediating the one or more problems.

Further, services relating to one or more aspects are also described and may be claimed herein.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
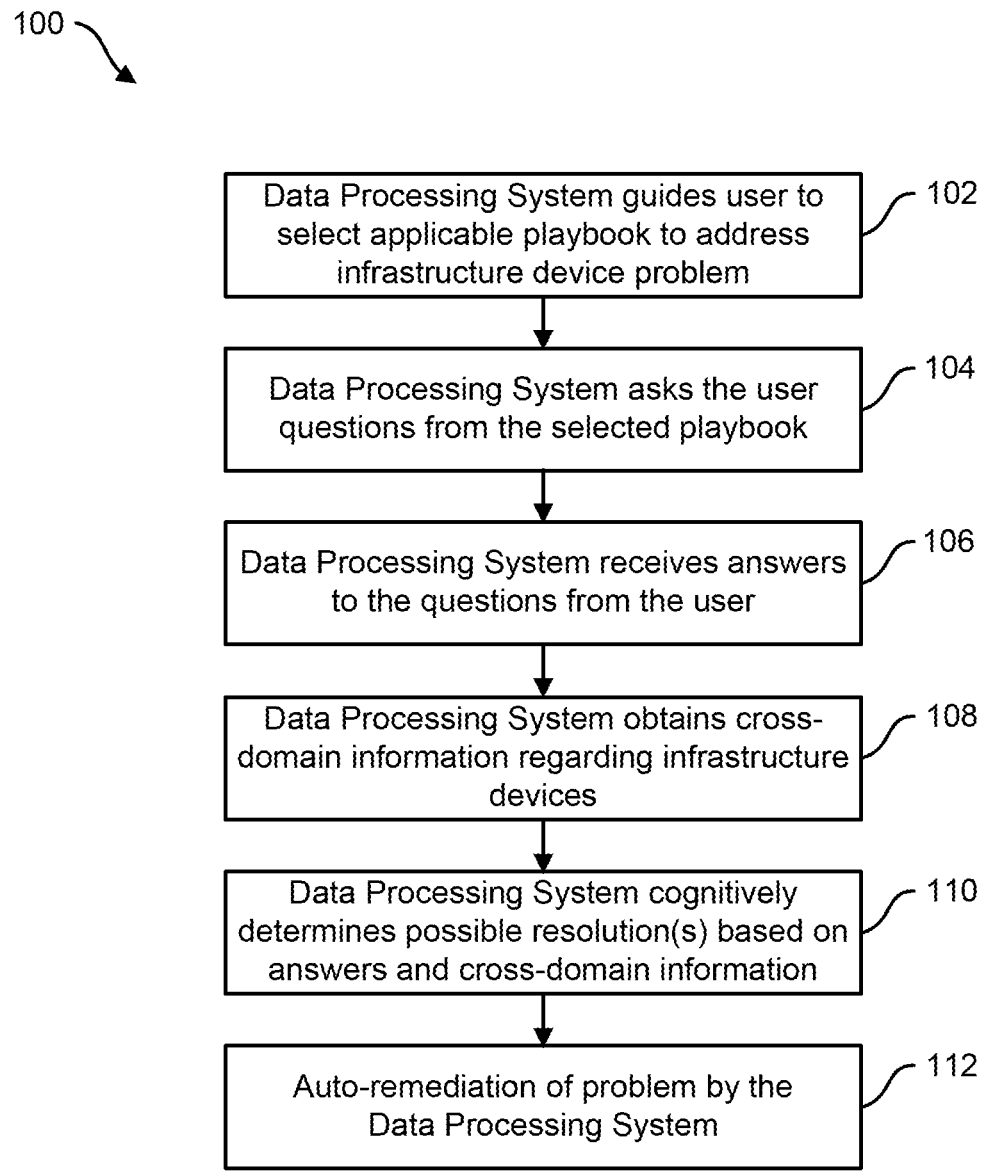
FIG. 1 is a flow diagram for one example of a computer-implemented method of finding, troubleshooting and auto-remediating problems in storage environments, in accordance with one or more aspects of the present disclosure.

In accordance with one or more aspects of the present invention, disclosed is a system for finding, troubleshooting and auto-remediating problems with various and diverse SAN environments using a combination of a flow diagram and text-based on screen guidance.

The invention assists people who may be at a lower skill level or others, in finding and resolving problems with the device by consistently following a standardized set of logical steps. This system also stores the output of these steps for later root cause analysis and reporting.

The system guides the user through by both visual flow diagrams and text prompts on screen with questions. Optionally, the system may, for example, accept voice input from the user and/or the system may speak to the user, similar to virtual assistants. The troubleshooting and problem resolution then proceed either from questions the user answers or by clicking on specific steps within the flow diagram and, for example, storing the output of these steps for root cause analysis and reporting.

Of note, the system considers cross-domain information to triangulate a problem and determine an action to take, e.g., server, SAN, and storage information. In one example flow, a SAN Fabric switch slow drain device or port issue being used by a novice user with very little field experience. In another example, a more general troubleshooting flow is disclosed for a SAN performance issue.

As used herein, the term "real-time" refers to a period of time necessary for data processing and presentation to a user to take place, and which is fast enough that a user does not perceive any significant delay. Thus, "real-time" is from the perspective of the user.

As used herein, the term "auto-remediation" or "auto-remediating" refers to either or both of non-physical and physical corrective actions for infrastructure devices in an active storage environment. Non-physical corrective actions in this context may include, for example, power cycling a device, rebooting a device, changing a configuration of a device, changing software running on a device (e.g., updating) and re-routing paths around failed devices. Physical corrective actions in this context may include, for example, replacing failed components of a device, replacing cables and unplugging and re-plugging cables. In one example, one or more robots in proximity to the infrastructure devices could be directed by the data processing system to take physical corrective actions.

As used herein, the term "storage fabric" refers to hardware that connects work stations and servers to storage devices in an active storage environment (e.g., a SAN). The storage fabric enables any-server-to-any-storage device connectivity through the use of Fibre Channel switching technology.

As used herein, in the context of active storage networks, the term "cross-domain information" refers to the data processing system obtaining information (e.g., status information) about infrastructure devices (e.g., switches and storage devices) across the active storage environment. In one example, the data processing system directly communicates with the infrastructure devices.

As used herein, the term "major incident" refers to an event which has significant impact or urgency for the business/organization and which demands a response beyond the routine incident management process, and may also be referred to as a "Client Impacting Event/Major Incident (CIE/MI)."

FIG. 1 is a flow diagram 100 for one example of a computer-implemented method of finding, troubleshooting and auto-remediating problem(s) with infrastructure device(s), for example, switches and storage devices in an active storage environment, for example, a storage area network or a SAN fabric. The method begins by guiding 102 a user, by a data processing system of the active storage environment, to select an applicable playbook of troubleshooting logic from among playbooks of different troubleshooting logic to address problem(s) with infrastructure device(s) of the active storage environment. Such playbooks can include, for example, an active storage network (e.g., a SAN) failure playbook, checking basic operation status, a customer initiated emergency escalation process playbook, a SAN performance guidance playbook and a playbook selection guide. These are merely examples of possible playbooks; it should be clear that many other possible playbooks may be used for a given active storage network. The method continues by asking 104 the user, by the data processing system, questions from the applicable playbook to identify a possible resolution path for the problem(s), resulting in an identified resolution path, and receiving 106, by the data processing system, answers to the questions from the user. Continuing, the method includes obtaining 108, by the data processing system, cross-domain information regarding infrastructure device(s) potentially relevant to the problem(s), resulting in obtained cross-domain information; cognitively determining 110, by the data processing system, possible resolution(s) based on the answers and the obtained cross-domain information; and auto-remediating 112 the problem(s). The obtained cross-domain information can include, for example, information regarding various storage devices (e.g., hard drives or solid state drives) and/or network switches. Advantageously, the data processing system can communicate with the storage devices as if they were one device.

Figure 2:
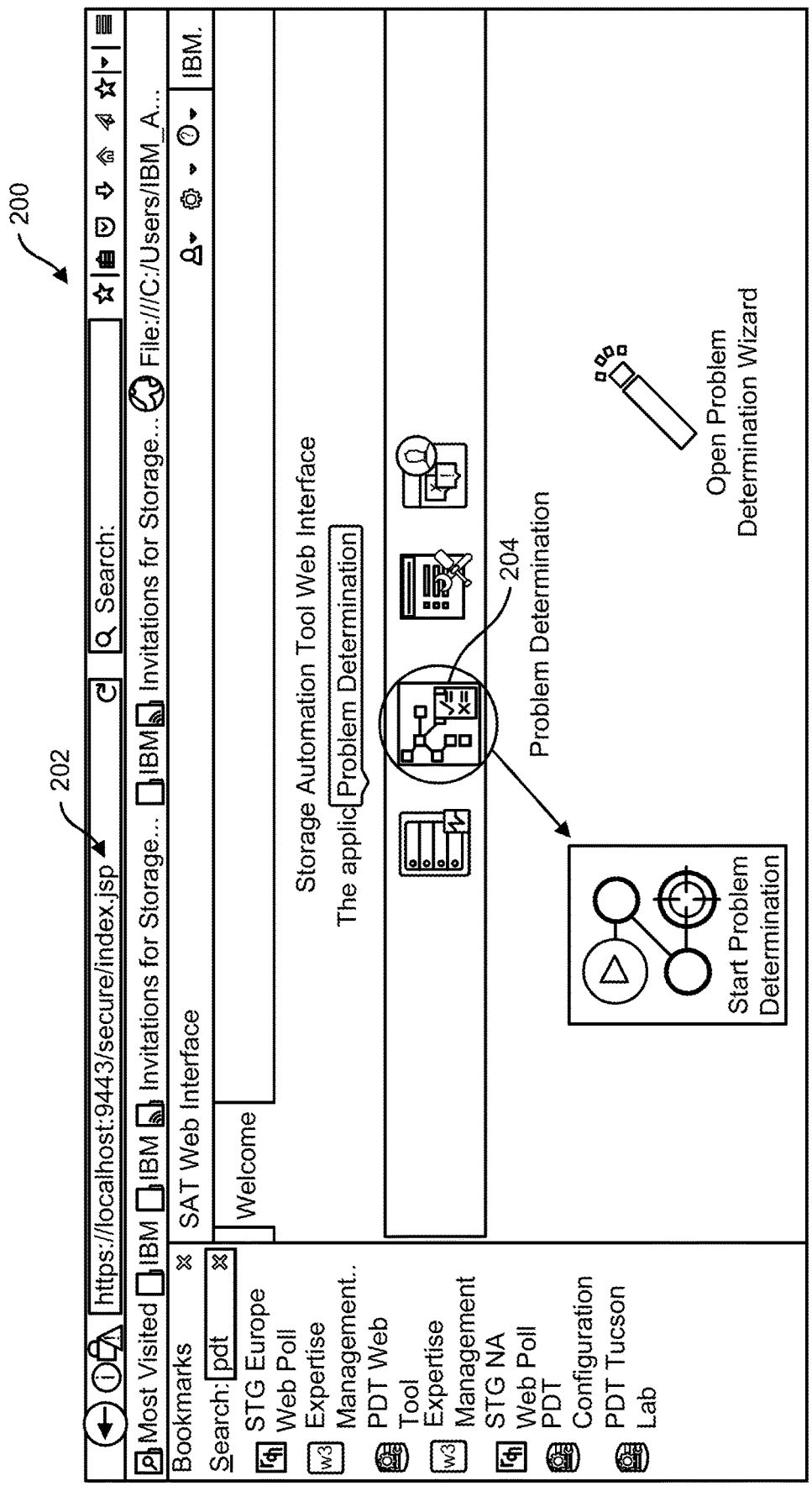
FIG. 2 depicts one example of a starting screen for a Storage Automation Tool Web Interface showing a problem determination button, in accordance with one or more aspects of the present disclosure.
Figure 3:
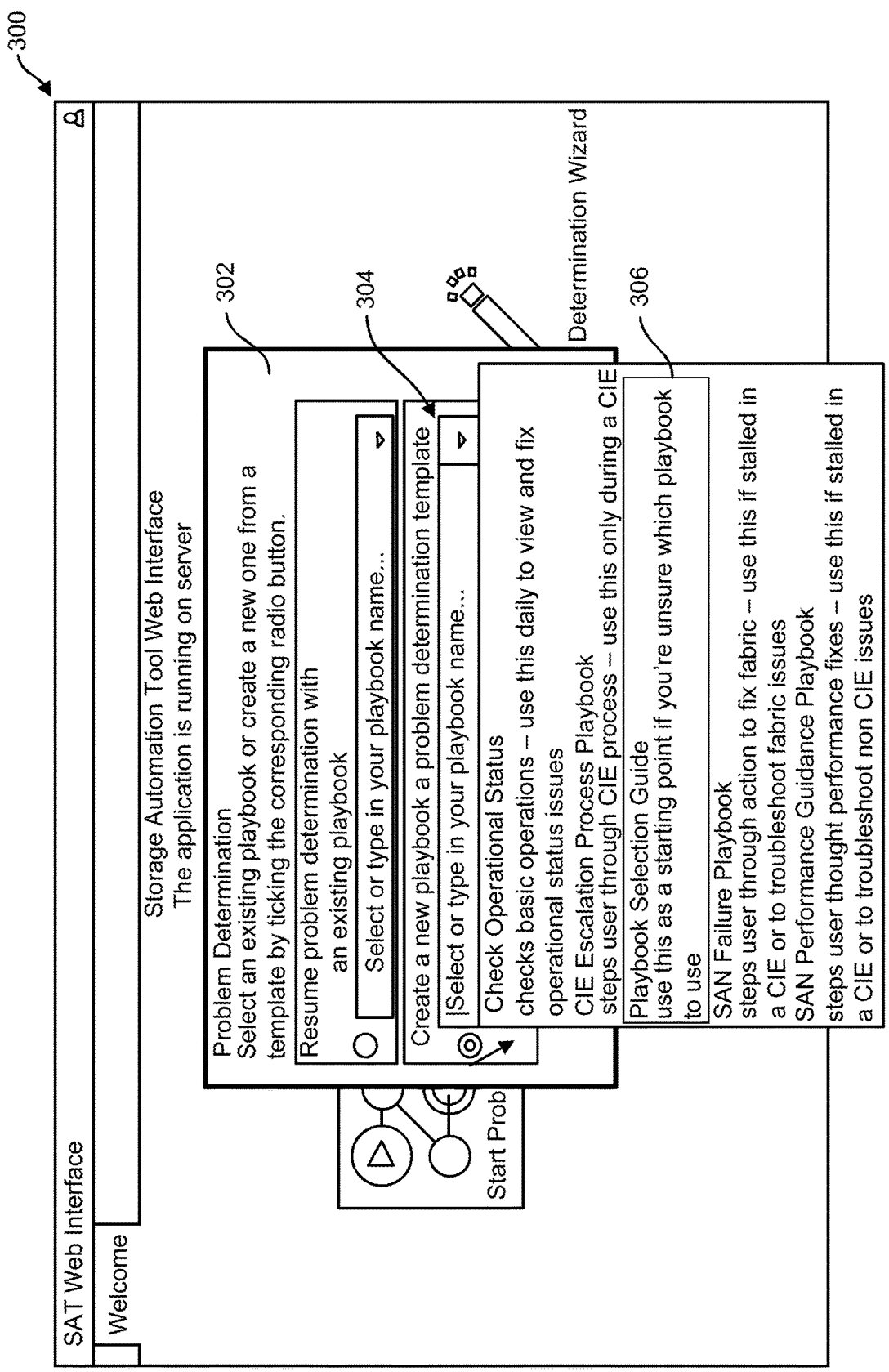
FIG. 3 depicts one example of a screen showing a list of available playbooks in response to selecting the determination button of FIG. 2, in accordance with one or more aspects of the present disclosure.
Figure 4:
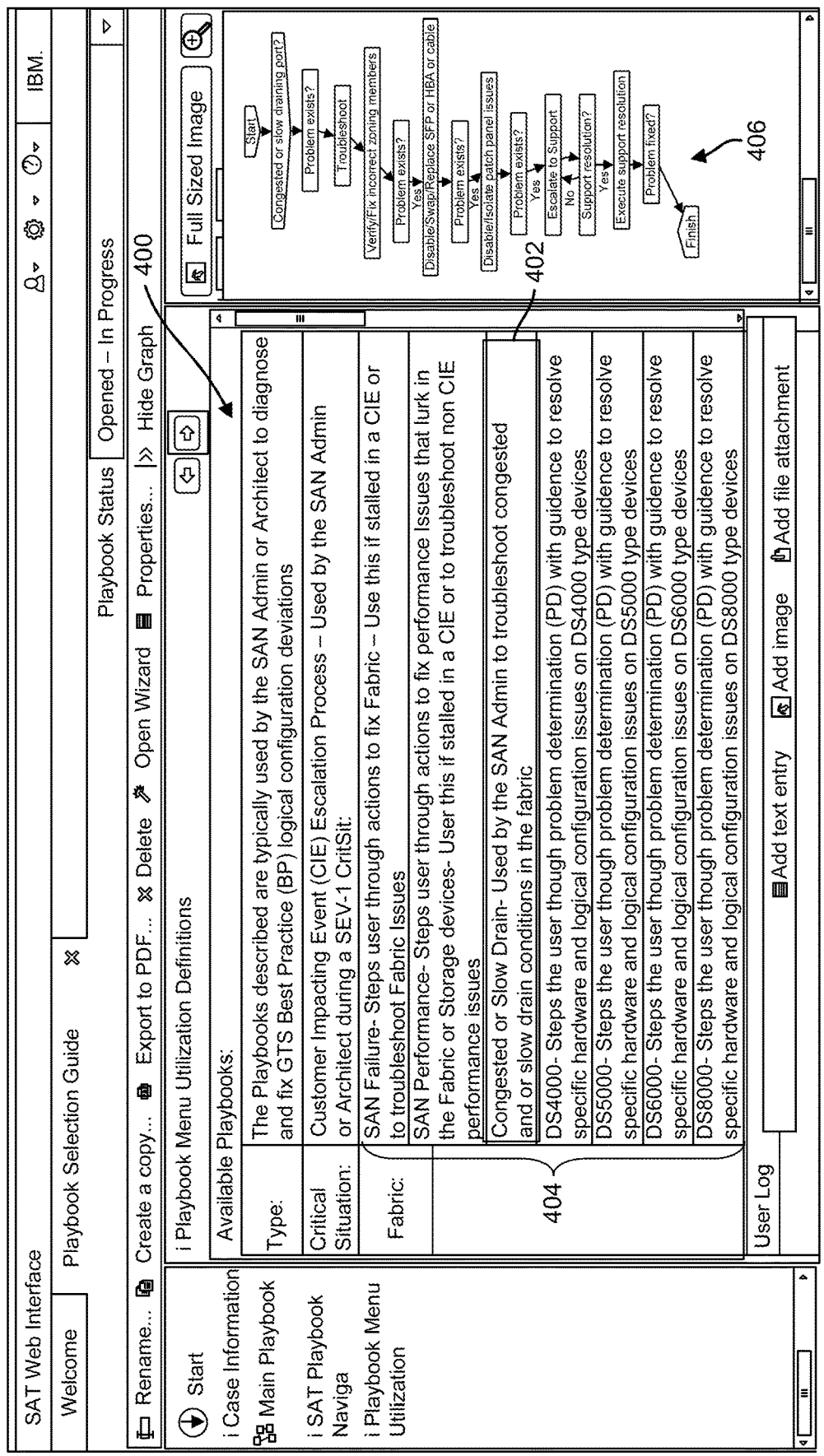
FIG. 4 is a flow diagram for one example of visually perceiving a chosen solution path, in accordance with one or more aspects of the present disclosure.

FIGS. 2-4 are screen shot examples of a graphical user interface (GUI) for finding a slow drain device/port problem, in accordance with one or more aspects of the present disclosure.

The method begins, for example, in a screen 200 by initiating a Storage Automation Tool Web Interface (SATPD) Wizard by, for example, entering 202 a URL (Uniform Resource Indicator) or IP address of a host where an active storage network (e.g., a SAN and/or fabric) is installed and running. The troubleshooting begins with the user selecting a problem determination icon 204. As shown, another option includes opening a problem determination wizard. A new screen 300 in FIG. 3 will be displayed in response to selecting the problem determination icon of FIG. 2. In the problem determination panel 302, from, for example, a dropdown box 304, the user in this example chooses 306 the playbook selection guide. The user here is inexperienced with troubleshooting storage networks. A user with no experience only knows there is a performance problem, but may not know which playbook to pick to get to problem resolution and auto-remediation the most optimal way. Other playbook choices include, for example, one to check operational status of the active storage environment, which checks basic operations. Other examples of playbooks include, for example: one for a Customer Impacting Event (CIE) escalation process; one for an active storage network (e.g., SAN or fabric) failure; and one for an active storage network (e.g., SAN or fabric) performance guidance. Of course, these are only examples of possible playbooks; many more are possible.

The example playbooks in FIG. 4 may be used by, for example, an administrator or architect of an active storage environment to diagnose and remediate, for example, logical configuration deviations. In one example, the playbook selection guide gives the user an overview 400 of what each playbook is used for in troubleshooting specific problems in a broad realm of possible issues, including, for example, a major incident used by the SAN administrator or architect during a "major incident": "SAN Failure," which steps the user through actions to fix the fabric," used if stalled in a major incident or to troubleshoot fabric issues; "SAN Performance," which steps the user through actions to fix performance issues that lurk in the fabric or storage devices and used if stalled in a major incident or to troubleshoot non-major incident performance issues; for example, storage devices "DS4000," "DS5000," "DS6000" and "DS8000," respectively, which step the user through problem determination (PD) with guidance to resolve specific hardware and logical configuration issues on DS4000, DS5000, DS6000 and DS8000 type storage devices, as shown in FIG. 4. In this example, from a list 400 of available playbooks, the user selects 402 the topic of "Congested or Slow Drain" in a Storage Area Network (SAN) fabric. As one skilled in the art will know, a SAN fabric refers to the hardware that connects workstations and servers to storage devices (e.g., hardware and/or solid state storage) in a SAN and is referred to as a "fabric." The SAN fabric enables any-server-to-any-storage device connectivity through the use of, for example, Fibre Channel switching technology. In particular, in FIG. 4, the user is presented with radio buttons 404 that can be selected to advance into new paths for well-known performance blockers or more general paths that may lead to more specific paths. The user in this example has decided to explore performance issues that are caused by slow drain ports as a starting point as shown in the screenshot below by clicking the SlowDrain radio button. Also shown in FIG. 4 is a simple flow diagram 406 to visually perceive a solution path chosen.

Figure 5:
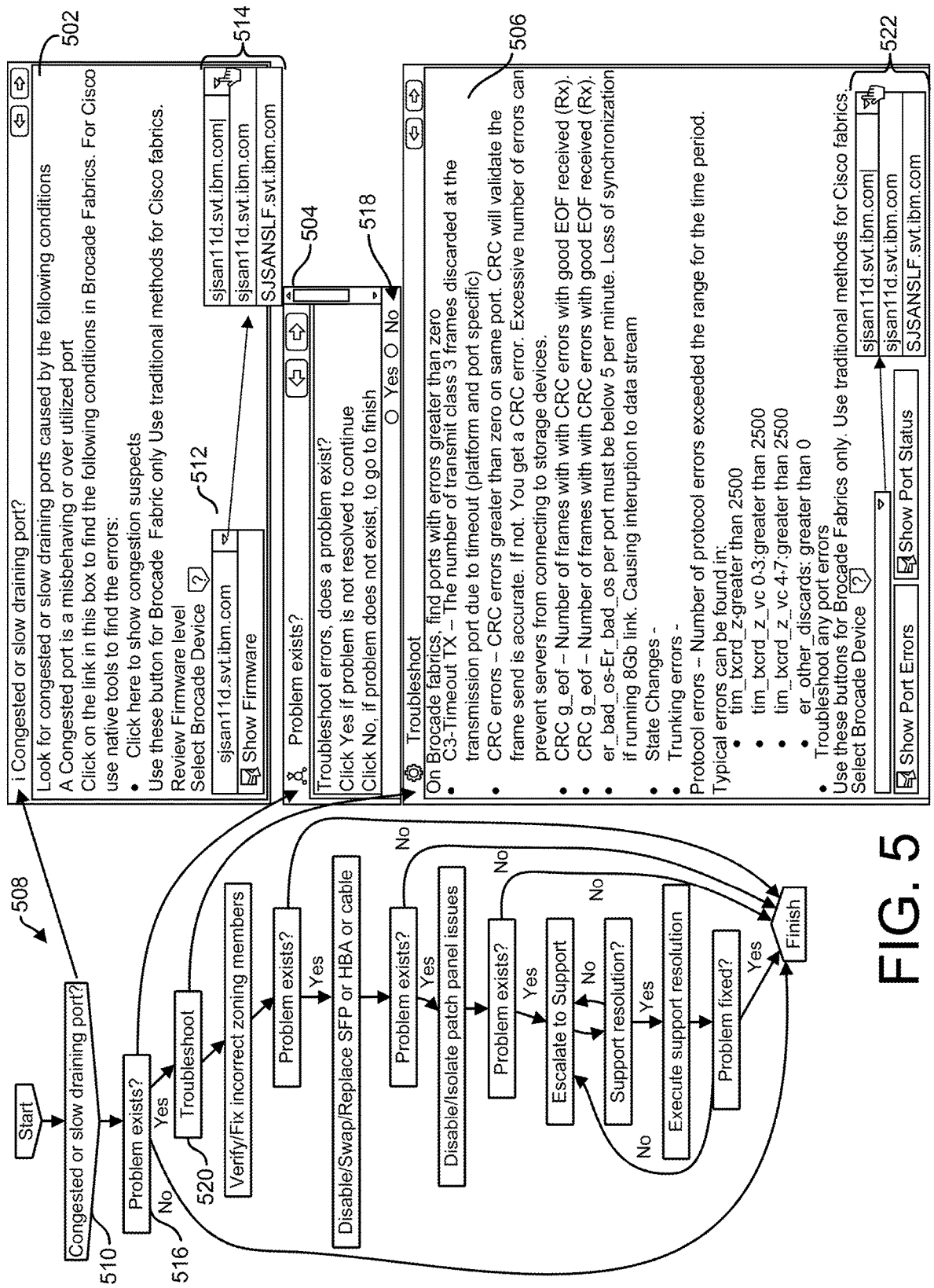
FIG. 5 is a flow diagram and corresponding screens for one example of troubleshooting a congested or slow drain, in accordance with one or more aspects of the present disclosure.

As shown in FIG. 5, the screens (more generally, visual guides) 502, 504 and 506 and flow diagram 508 advance to reveal a new path to explore and troubleshoot. In screen 502, corresponding to inquiry 510 in the flow diagram, a drop down menu 512 gives options 514 for selecting a storage networking device. The method proceeds with inquiry 516, corresponding to screen 504, asking whether a problem exists and providing buttons 518 for a yes or no answer from the user. If the user selects "yes," the method proceeds to troubleshooting 520 of the flow diagram, corresponding to screen 506, where the user selects 522 a storage network device to troubleshoot.

Figure 6:
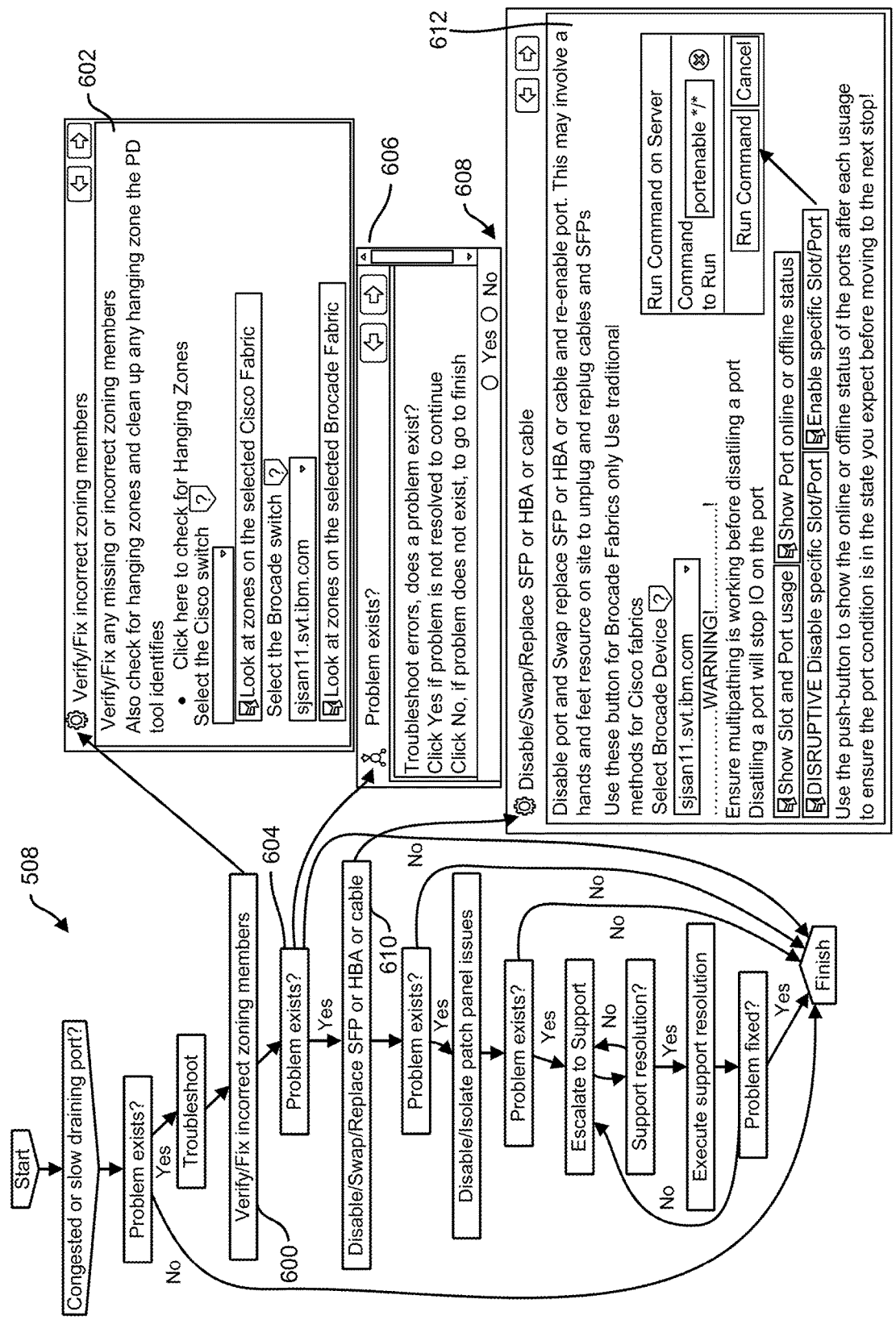
FIG. 6 is a flow diagram and corresponding screens for one example of continuing the troubleshooting of FIG. 5, in accordance with one or more aspects of the present disclosure.

The method then progresses, as shown in FIG. 6, to verify/fix incorrect zoning members 600, corresponding to screen 602. The method then inquires 604 as to whether a problem still exists, corresponding to screen 606 which provides selections 608 for "yes" or "no." Where a problem still exists (a "yes" answer), the method proceeds to a step 610, corresponding to screen 612, of "Disable/Swap/Replace SFP (Small Form Factor Pluggable) optical transceiver or Host Bus Adapter (HBA) or cable," meaning to disable the chosen port and swap or replace the SFP optical transceiver or HBA or cable, and re-enable the port, which may involve having a technician or someone on site to unplug/replug cables and SFP optical transceiver. As one skilled in the art will know, an SFP optical transceiver is a device which interfaces electrical signals to optical connections. In the context of a SAN, for example, the SFP optical transceiver allows the electronics in a SAN switch to send and receive optical pulses in Fibre Channel Cables.

Figure 7:
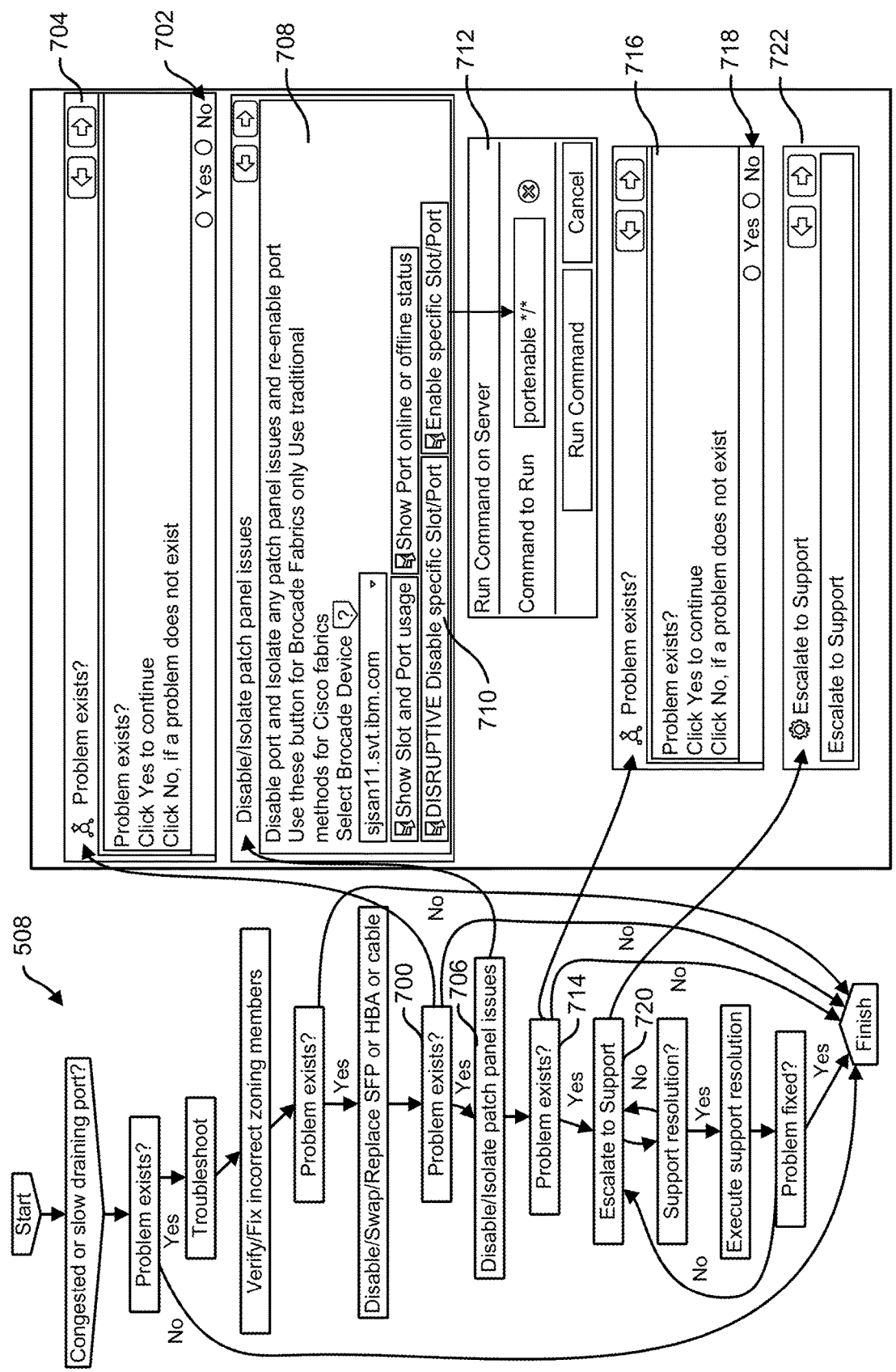
FIG. 7 is a flow diagram and corresponding screens for one example of continuing the troubleshooting of FIG. 6, in accordance with one or more aspects of the present disclosure.

At this point, as shown in FIG. 7, an inquiry 700 is made as to whether a problem still exists, providing for a yes or no answer 702 in screen 704. Where a problem still exists (i.e., a "yes" choice), the method moves on to disable/isolate patch panel issues 706, which corresponds to screen 708 with various options, including an option 710 to disable a specific slot/port, the selection of which triggers a pop-up box 712 to input a command to run on the servers. Again, the method then inquiries 714 as to whether a problem still exists, which corresponds to screen 716, providing options 718 for a yes or no answer from the user. Where a problem still exists (i.e., a "yes" answer), an option 720 is provided for escalating the problem to tech support, corresponding to screen 722.

Figure 8:
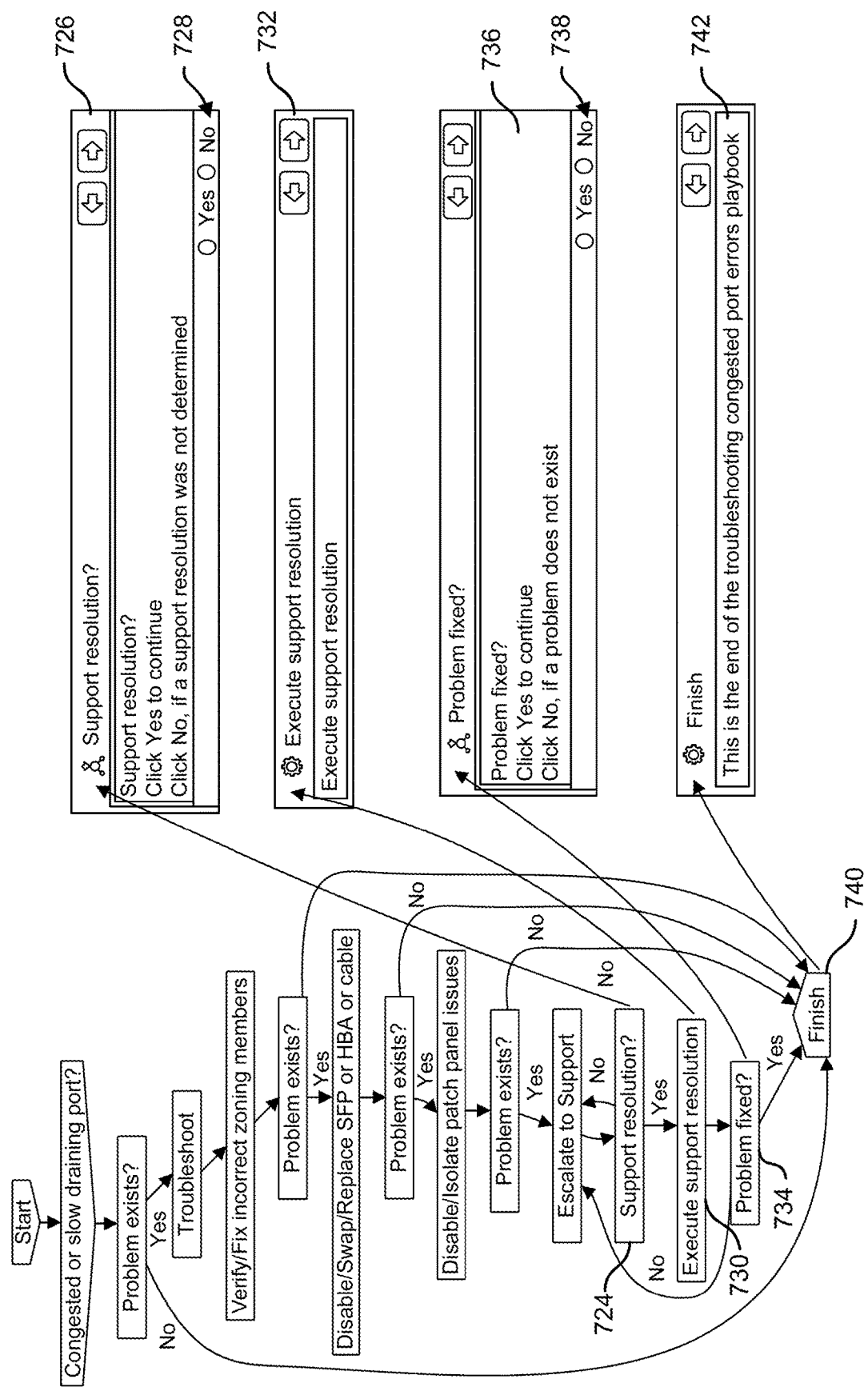
FIG. 8 is a flow diagram and corresponding screens for one example of continuing the troubleshooting of FIG. 7, in accordance with one or more aspects of the present disclosure.

As shown in FIG. 8, the method proceeds to inquiry 724 as to whether Support has a resolution, corresponding to screen 726 with options 728 for a yes or no answer. Where there was a resolution (a "yes" answer), the support resolution is implemented 730, corresponding to screen 732. The method then inquires 734 (screen 736 with yes/no option 738) as to whether the problem was fixed (by the support resolution), If so, the method ends 740, corresponding to screen 742.

Figure 9:
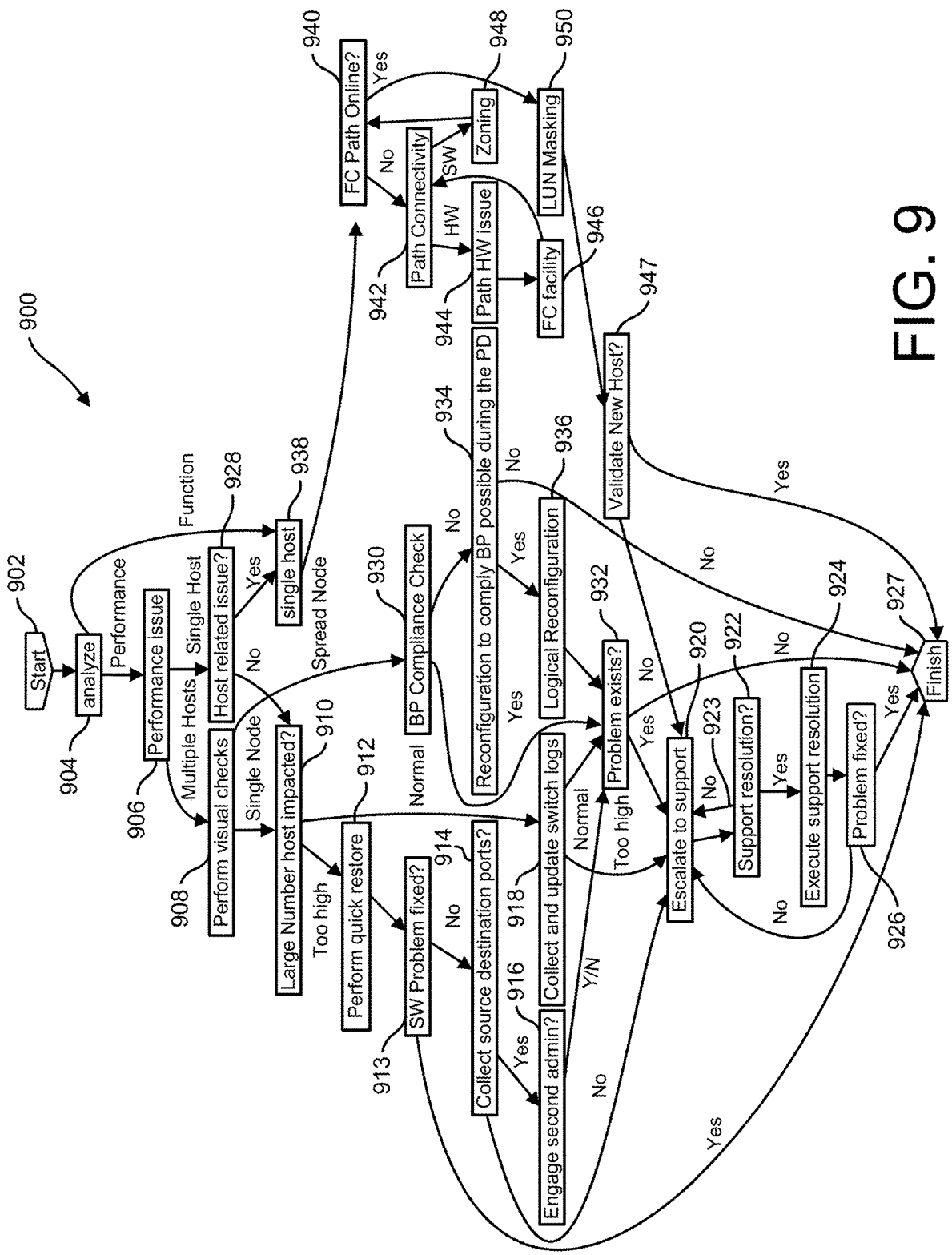
FIG. 9 is a flow diagram for one example of a computer-implemented method of finding, troubleshooting and auto-remediating a general performance issue with an active storage environment.

FIG. 9 is a flow diagram 900 for one example of a computer-implemented method of finding, troubleshooting and auto-remediating a general performance issue with an active storage environment (e.g., a SAN). This corresponds to playbook 508 in FIG. 5, the "SAN Performance Guidance Playbook." Note that in practice there would be various screens (more generally, visual guides) guiding the user through the troubleshooting, similar to FIGS. 6-8. The method begins 902 by analyzing 904 to determine if there is a performance problem with the SAN. Where the analysis indicates a performance issue 906, the method proceeds based on a single host or multiple hosts. Where there are multiple hosts, visual checks of the system are performed 908. For example, a check of ports light status or physical cable condition may be performed. For a single node or where inquiry 928 has a "no" answer, an inquiry 910 is made as to whether a large number of hosts are impacted. For example, in a system with 500 hosts, a "large number" in this context may be, for example, where 250 hosts out of the 500 are impacted. Where the number of impacted hosts is considered too high, for example, about 25 percent to about 50 percent of the hosts in the system, a quick restore, for example, may be performed 912. After the quick restore is performed, an inquiry 913 is made as to whether the software problem has been fixed; if so, the method ends 927 (i.e., "finish").

If the software problem has not been fixed, an inquiry 914 is made as to whether source destination ports should be collected. Where the source destination ports are collected (a "yes" answer to inquiry 914), inquiry 916 is made as to whether a second administrator should be engaged. If the answer is "yes," then the same step are used as if the answer were "no." However, in one embodiment, a management resource can track whether or not two people were engage to execute multiple steps in parallel. A timely resolution could be derived quicker with two resources working in parallel, but is not necessary. Returning to inquiry 910, if the number of hosts impacted is other than large (e.g., expected number or none), switch logs are collected and updated 918. Where a number of switch logs collected is considered too complex to analyze without support intervention, then the issue may be, for example, escalated 920 to support. After escalation to support, an inquiry 922 is made as to whether support was able to determine a resolution to the performance issue; if not, the method returns to support escalation 920. If support was able to determine a resolution to the issue, the support resolution is executed 924, followed by an inquiry 926 as to whether the support resolution fixed the problem. If the problem is fixed, the method finishes 927.

If the problem is not fixed by the support resolution, the method returns to escalating 920 back to support. Returning to collecting and updating 918 switch logs, if the number of logs collected is other than too high (e.g., normal), then the method proceed to inquiry 932 regarding whether a problem exists. In one example, an active storage environment that is considered too complex, after support analyzes, then a root cause other than what the system can determine may be given by support. Returning now to performance issue 906, where there is only a single host, an inquiry 928 is made as to whether the performance issue is a host-related issue. If the issue is not host-related, the method proceeds to inquiry 910 and proceeds as described above. If the performance issue is determined to be host-related, the method proceeds to follow 938, a path of troubleshooting a single host, rather than multiple hosts. The method proceeds to inquiry 940 as to whether there is a fibre channel path or port/cable connection online. If the answer to inquiry 940 is "yes," LUN (Logical Unit Number) masking is performed, followed by an inquiry 947 as to whether the new host should be validated. As one skilled in the art will know, LUN masking is an authorization process that makes a Logical Unit Number available to some hosts and unavailable to other hosts. LUN masking is a level of security that makes a LUN available to only selected hosts and unavailable to all others. If the new host is to be validated, then the method ends 927.

Returning to inquiry 940, if the answer is "no," then the method branches to path connectivity 942. If the path is a hardware path 944, a check by the system to verify if all FC (Fibre Channel) ports are online is performed 946. After exploring 946 the path goes back to 942 and the system/user then goes down the path to 948. If the path is a software path, zoning 948 is performed. Zoning is a configuration in the Fabric switch that isolates IO traffic to only flow from port to ports defined within the Zone itself. If neither path is possible, the method returns to path connectivity 942. Returning to visual checks being performed 908, if the system has a spread node (a condition where the host connection ports are spread across multiple Nodes rather than a single node), then a "Best Practices Compliance Check" is performed 930. If the Compliance Check is negative, then the system reconfigures 934 to comply with the Problem Determination Session. If the "Best Practices Compliance Check" is positive, then the system proceeds to inquiry 932 as to whether a problem exists and proceeds as described previously. Where the reconfiguration is positive, then a logical reconfiguration 936 is performed and proceeds to inquiry 932. If the reconfiguration is negative, then the method finishes 927.

Certain embodiments herein may offer various technical computing advantages involving computing advantages to address problems arising in the realm of computer networks. Particularly, finding, troubleshooting and auto-remediating problems with infrastructure devices of an active storage network, for example, a storage area network (SAN). Various decision data structures can be used to drive artificial intelligence (AI) decision making, such as a decision data structure that cognitively determines possible resolution(s) based on user answers to questions and cross-domain information about, for example, infrastructure devices in an active storage environment, for example, a SAN or storage fabric. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

In the case where user responses include free-form text, Natural Language Understanding may be used. The umbrella term "Natural Language Understanding" can be applied to a diverse set of computer applications, ranging from small, relatively simple tasks such as, for example, short commands issued to robots, to highly complex endeavors such as, for example, the full comprehension of newspaper articles or poetry passages. Many real world applications fall between the two extremes, for example, text classification for the automatic analysis of emails and their routing to a suitable department in a corporation does not require in-depth understanding of the text, but it does need to work with a much larger vocabulary and more diverse syntax than the management of simple queries to database tables with fixed schemata.

A Natural Language Understanding (NLU) process for determining one or more NLU output parameters of a text-based communication, for example, can be used. NLU processes can include one or more of a topic classification process that determines topics of text-based communications and output one or more NLU output parameters, a sentiment analysis process which determines a sentiment parameter for a text-based communication, e.g. polar sentiment NLU output parameters, "negative," "positive," and/or non-polar NLU output sentiment parameters, e.g. "anger," "disgust," "fear," "joy," and/or "sadness" or other classification process for output of one or more other NLU output parameters e.g. one of more "social tendency" NLU output parameter or one or more "writing style" NLU output parameter.

By running NLU processes, a number of items can be addressed, including one or more of (a) topic classification and output of one or more topic NLU output parameter for a received text-based communication (b) sentiment classification and output of one or more sentiment NLU output parameter for a received text-based communication or (c) other NLU classifications and output of one or more other NLU output parameter for the received text-based communication.

Topic analysis for topic classification and output of NLU output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLU parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader).

In one example, sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Regardless of the approach used, most natural language understanding systems share some common components. The system needs a lexicon of the language and a parser and grammar rules to break sentences into an internal representation. The construction of a rich lexicon with a suitable ontology requires significant effort, for example, the WORDNET lexicon required many person-years of effort. WORDNET is a large lexical database of English. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated, for example, with a browser specially configured to provide the navigation functionality. WORDNET's structure makes it a useful tool for computational linguistics and natural language processing.

WORDNET superficially resembles a thesaurus, in that it groups words together based on their meanings. However, there are some important distinctions. First, WORDNET interlinks not just word forms—strings of letters—but specific senses of words. As a result, words that are found in close proximity to one another in the network are semantically disambiguated. Second, WORDNET labels the semantic relations among words, whereas the groupings of words in a thesaurus does not follow any explicit pattern other than meaning similarity.

The system also needs a semantic theory to guide the comprehension. The interpretation capabilities of a language understanding system depend on the semantic theory it uses. Competing semantic theories of language have specific trade-offs in their suitability as the basis of computer-automated semantic interpretation. These range from naive semantics or stochastic semantic analysis to the use of pragmatics to derive meaning from context.

Advanced applications of natural language understanding also attempt to incorporate logical inference within their framework. This is generally achieved by mapping the derived meaning into a set of assertions in predicate logic, then using logical deduction to arrive at conclusions. Therefore, systems based on functional languages such as the Lisp programming language need to include a subsystem to represent logical assertions, while logic-oriented systems such as those using the language Prolog, also a programming language, generally rely on an extension of the built-in logical representation framework.

A Natural Language Classifier, which could be a service, for example, applies cognitive computing techniques to return best matching predefined classes for short text inputs, such as a sentence or phrase. It has the ability to classify phrases that are expressed in natural language into categories. Natural Language Classifiers ("NLCs") are based on Natural Language Understanding (NLU) technology (previously known as "Natural Language Processing"). NLU is a field of computer science, artificial intelligence (AI) and computational linguistics concerned with the interactions between computers and human (natural) languages.

For example, consider the following questions: "When can you meet me?" or When are you free?" or "Can you meet me at 2:00 PM?" or "Are you busy this afternoon?" NLC can determine that they are all ways of asking about "setting up an appointment." Short phrases can be found in online discussion forums, emails, social media feeds, SMS messages, and electronic forms. Using, for example, IBM's Watson APIs (Application Programming Interface), one can send text from these sources to a natural language classifier trained using machine learning techniques. The classifier will return its prediction of a class that best captures what is being expressed in that text. Based on the predicted class one can trigger an application to take the appropriate action such as providing an answer to a question, suggest a relevant product based on expressed interest or forward the text to an appropriate human expert who can help.

Applications of such APIs include, for example, classifying email as SPAM or No-SPAM based on the subject line and email body; creating question and answer (Q&A) applications for a particular industry or domain; classifying news content following some specific classification such as business, entertainment, politics, sports, and so on; categorizing volumes of written content; categorizing music albums following some criteria such as genre, singer, and so on; combining the Natural Language Classifier service with a conversation service if one wants their application to engage in a conversation with a user; and classifying frequently asked questions (FAQs).

In one example, a cognitive computer system performs the method. In general, the term "cognitive computing" (CC) has been used to refer to new hardware and/or software that mimics the functioning of the human brain and helps to improve human decision-making, which can be further improved using machine learning. In this sense, CC is a relatively new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people; ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

Figure 13:
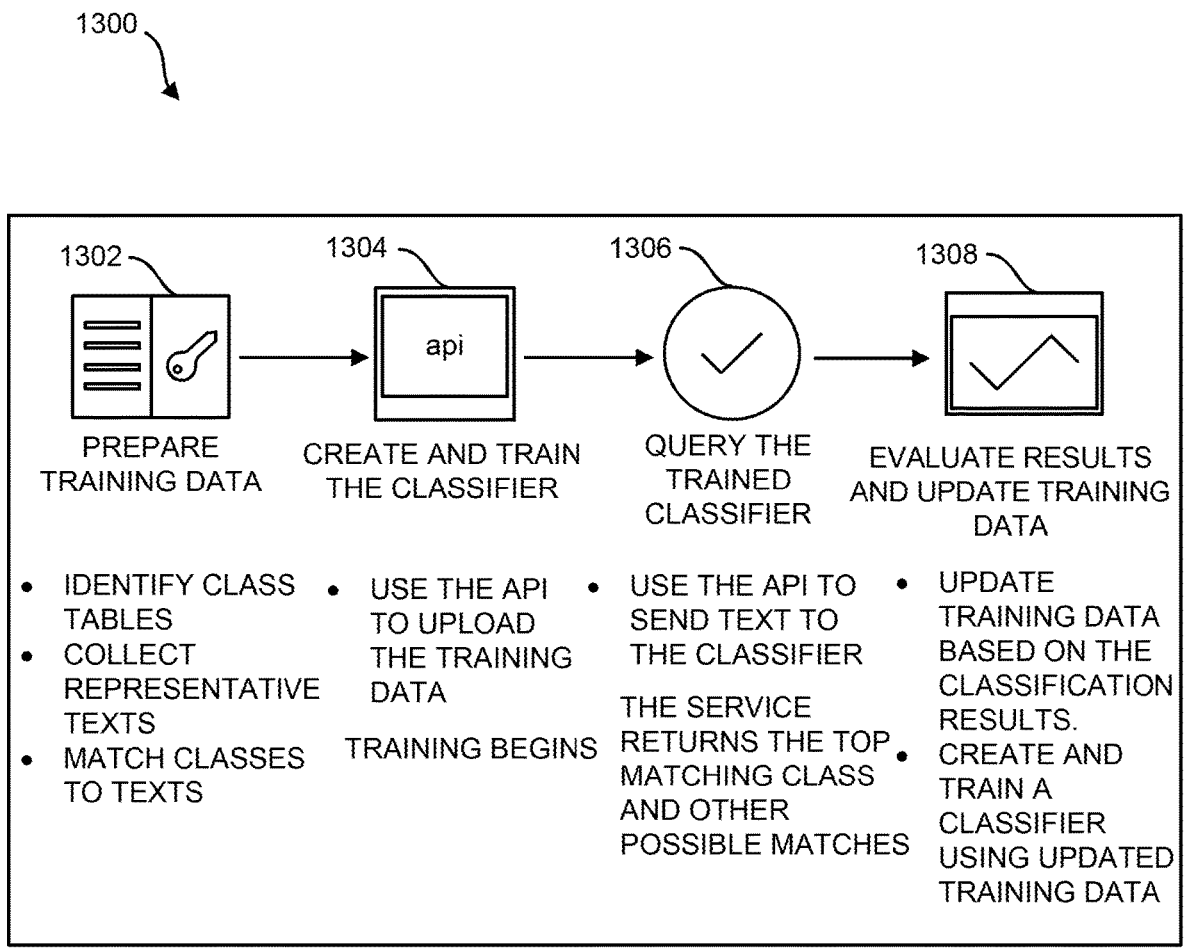
FIG. 13 depicts one example of creating and using a natural language classifier, in accordance with one or more aspects of the present disclosure.

FIG. 13 is a hybrid flow diagram 1300 of one example of an overview of the basic steps for creating and using a natural language classifier service. Initially, training data for machine learning is prepared, 1302, by identifying class tables, collecting representative texts and matching the classes to the representative texts. An API (Application Planning Interface) may then be used to create and train the classifier 1304 by, for example, using the API to upload training data. Training may begin at this point. After training, queries can be made to the trained natural language classifier, 1306. For example, the API may be used to send text to the classifier. The classifier service then returns the matching class, along with other possible matches. The results may then be evaluated and the training data updated, 1308, for example, by updating the training data based on the classification results. Another classifier can then be trained using the updated training data.

In a first aspect, disclosed above is a computer-implemented method of finding, troubleshooting and auto-remediating problems in storage environments. The method includes guiding a user, by a data processing system of an active storage environment, to select an applicable playbook of troubleshooting logic from among a plurality of playbooks of different troubleshooting logic to address one or more problems with one or more infrastructure devices of the active storage environment. The method further includes: asking the user, by the data processing system, a plurality of questions from the applicable playbook to identify a possible resolution path for the one or more problems, resulting in an identified resolution path; receiving, by the data processing system, a plurality of answers to the plurality of questions from the user; obtaining, by the data processing system, cross-domain information regarding one or more infrastructure devices potentially relevant to the one or more problems, resulting in obtained cross-domain information; cognitively determining, by the data processing system, one or more possible resolutions based on the plurality of answers and the obtained cross-domain information; and auto-remediating, by the data processing system, the one or more problems.

In one example, the playbooks may include, for example, a playbook selection guide for assisting the user with finding an applicable playbook. In one example, the active storage environment may include, for example, storage fabric(s), and for the storage fabric(s), the playbook selection guide may include, for example, choices of a storage environment failure, a storage environment performance issue and at least one of a congested drain and a slow drain. In one example, the playbook selection guide may include, for example, resolution path(s) for problem(s). In another example, the playbooks may include, for example, resolution path(s) that are general and lead to more specific paths.

In one example, the playbooks in the computer-implemented method of the first aspect may include, for example, a playbook for checking basic operations of the active storage environment.

In one example, the computer-implemented method of the first aspect may further include, for example, making available to the user a flow diagram of at least a portion of the identified resolution path.

In one example, the obtaining in the computer-implemented method of the first aspect may include, for example, directly interfacing with the infrastructure device(s) of the active storage environment.

In one example, the active storage environment of the computer-implemented method of the first aspect may include, for example, at least one of a storage fabric and a storage system coupled to a storage fabric.

In one example, the method of the first aspect may further include, for example, using machine learning to improve accuracy of the cognitively determining.

In a second aspect, disclosed above is a system for finding, troubleshooting and auto-remediating problems in storage environments. The system includes a memory, and at least one processor in communication with the memory to perform a computer-implemented method of finding, troubleshooting and renewal problems in storage environments, the method including guiding a user, by a data processing system of an active storage environment, to select an applicable playbook of troubleshooting logic from among a plurality of playbooks of different troubleshooting logic to address one or more problems with one or more infrastructure devices of the active storage environment. The method further includes: asking the user, by the data processing system, a plurality of questions from the applicable playbook to identify a possible resolution path for the one or more problems, resulting in an identified resolution path; receiving, by the data processing system, a plurality of answers to the plurality of questions from the user; obtaining, by the data processing system, cross-domain information regarding one or more infrastructure devices potentially relevant to the one or more problems, resulting in obtained cross-domain information; cognitively determining, by the data processing system, one or more possible resolutions based on the plurality of answers and the obtained cross-domain information; and auto-remediating, by the data processing system, the one or more problems.

In one example, the playbooks may include, for example, a playbook selection guide for assisting the user with finding an applicable playbook. In one example, the active storage environment may include, for example, storage fabric(s), and for the storage fabric(s), the playbook selection guide may include, for example, choices of a storage environment failure, a storage environment performance issue and at least one of a congested drain and a slow drain. In another example, the playbook selection guide may include, for example, first resolution path(s) for specific problem(s) and second resolution path(s) that are general and lead to more specific paths.

In one example, the obtaining in the computer-implemented method of the second aspect may include, for example, directly interfacing with the infrastructure device(s) of the active storage environment.

In one example, the active storage environment of the computer-implemented method of the second aspect may include, for example, at least one of a storage fabric and a storage system.

In a third aspect, disclosed above is a computer program product for finding, troubleshooting and auto-remediating problems in storage environments. The computer program product includes a storage medium readable by a processor and storing instructions for performing a computer-implemented method of finding, troubleshooting and auto-remediating problems in storage environments, the method including guiding a user, by a data processing system of an active storage environment, to select an applicable playbook of troubleshooting logic from among playbooks of different troubleshooting logic to address problem(s) with infrastructure device(s) of the active storage environment. The method further includes: asking the user, by the data processing system, questions from the applicable playbook to identify a possible resolution path for the problem(s), resulting in an identified resolution path; receiving, by the data processing system, answers to the questions from the user; obtaining, by the data processing system, cross-domain information regarding infrastructure device(s) potentially relevant to the problem(s), resulting in obtained cross-domain information; cognitively determining, by the data processing system, possible resolution(s) based on the answers and the obtained cross-domain information; and auto-remediating, by the data processing system, the problem(s).

In one example, the playbooks may include, for example, a playbook selection guide for assisting the user with finding an applicable playbook. In one example, the active storage environment may include, for example, storage fabric(s), and for the storage fabric(s), the playbook selection guide may include, for example, choices of a storage environment failure, a storage environment performance issue and at least one of a congested drain and a slow drain. In another example, the playbook selection guide may include, for example, first resolution path(s) for specific problem(s) and second resolution path(s) that are general and lead to more specific paths.

In one example, the obtaining in the computer program product of the third aspect may include, for example, directly interfacing with the infrastructure device(s) of the active storage environment.

In one example, the active storage environment of the computer program product of the third aspect may include, for example, at least one of a storage fabric and a storage system.

Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms.

Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

Embodiments herein may utilize, for example, cognitive computing, which is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

Figure 10:
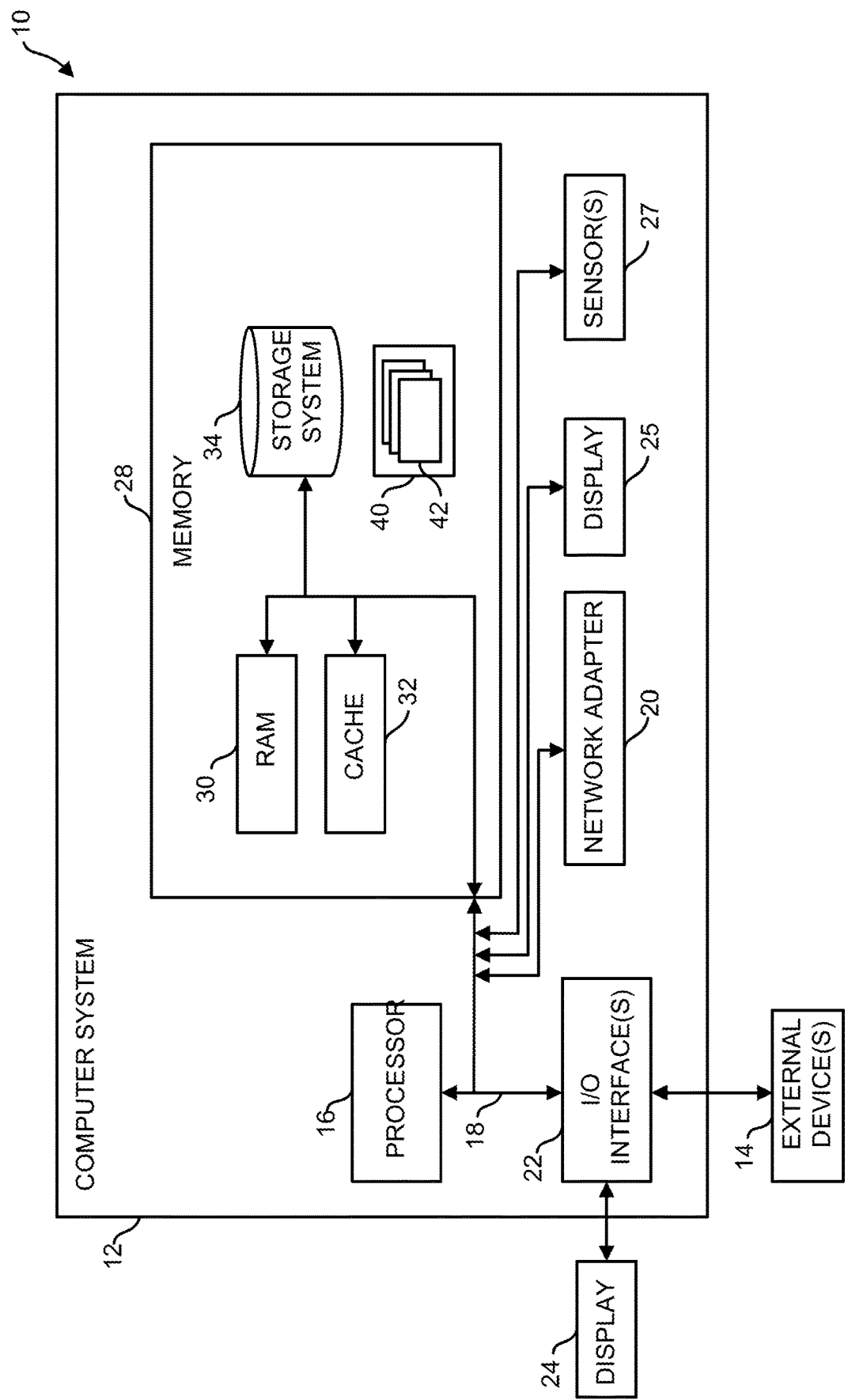
FIG. 10 is a block diagram of one example of a computer system, in accordance with one or more aspects of the present disclosure.
Figure 11:
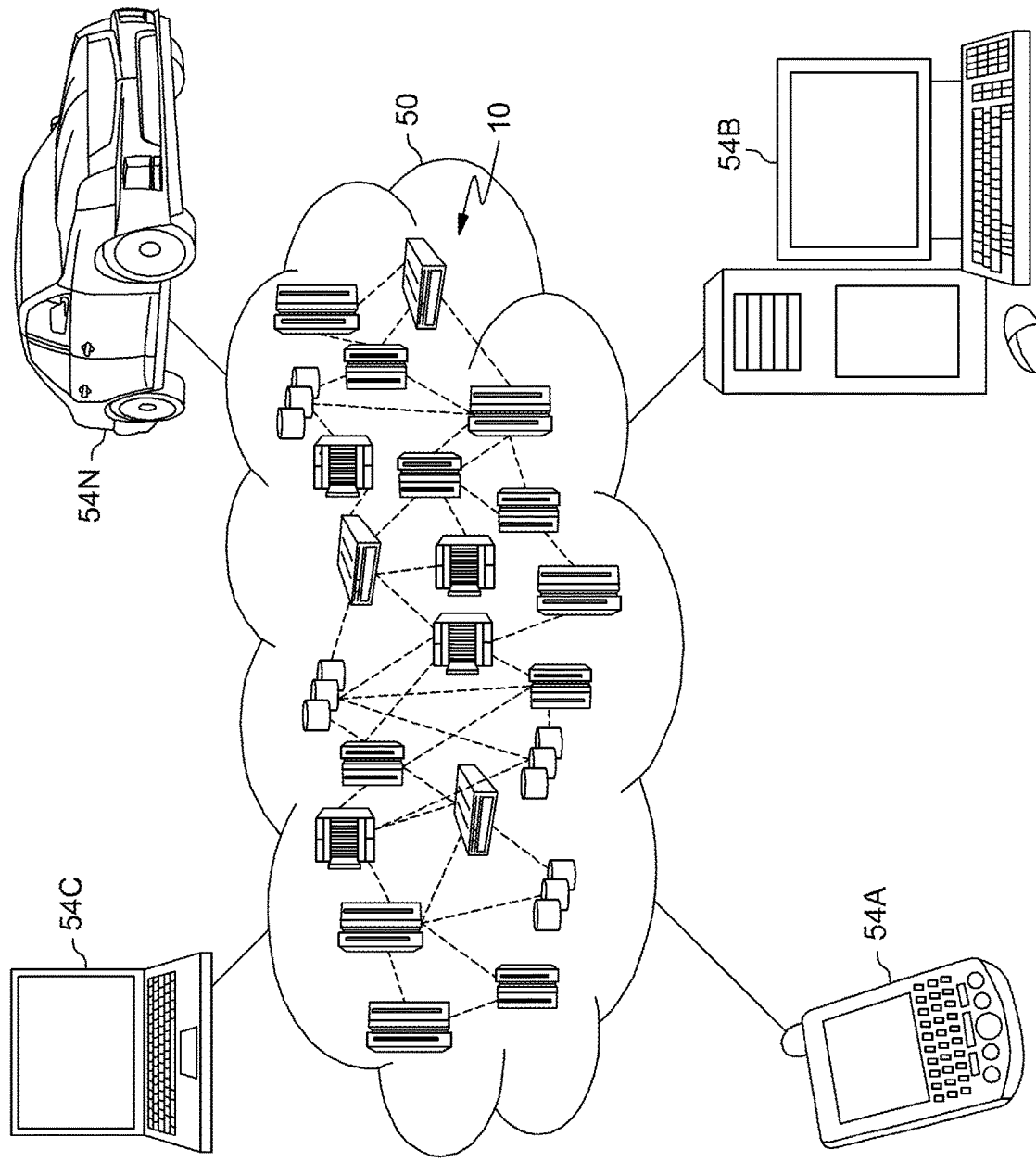
FIG. 11 is a block diagram of one example of a cloud computing environment, in accordance with one or more aspects of the present disclosure.
Figure 12:
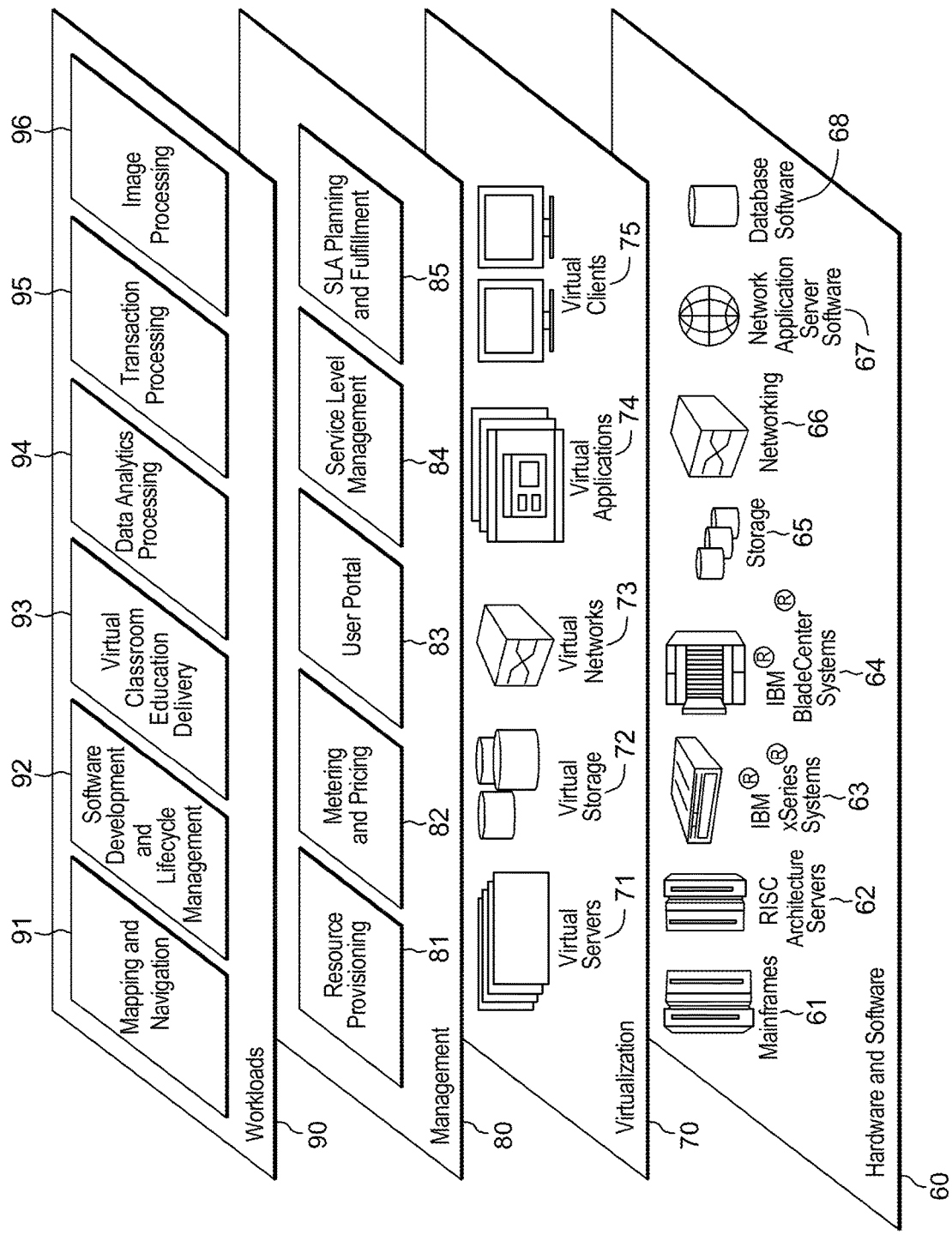
FIG. 12 is a block diagram of one example of functional abstraction layers of the cloud computing environment of FIG. 11, in accordance with one or more aspects of the present disclosure.

FIGS. 10-12 depict various aspects of computing, including a computer system and cloud computing, in accordance with one or more aspects of the present disclosure. One or more aspects of the present invention may be incorporated and/or used in a computing environment, an example of which is described with reference to FIG. 10.

Referring now to FIG. 10, a schematic of an example of a computing node useful with embodiment(s) herein is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 10, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 11-12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described with reference to, for example, FIGS. 1 and 9 herein and other functions described.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18.

In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 11 computing node 10 is described as being implemented in a cloud computing environment and accordingly is referred to as a cloud computing node in the context of FIG. 11.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image processing 96.

Aspects of the present invention and certain features, advantages, and details thereof, are explained herein with reference to the non-limiting examples illustrated in the accompanying drawings. Descriptions of well-known materials, fabrication tools, processing techniques, etc., are omitted so as not to unnecessarily obscure aspects of the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable storage medium(s) having computer readable program code embodied thereon.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other environments may incorporate and use one or more aspects of the present invention. Further, other events may be monitored and/or other actions may be taken in response to the events. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flow diagrams or flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method of finding, troubleshooting and auto-remediating problems in storage environments, the method comprising:
    guiding a user, by a data processing system of an active storage environment, to select an applicable playbook of troubleshooting logic from among a plurality of playbooks of different troubleshooting logic to address one or more problems with one or more infrastructure devices of the active storage environment;
    asking the user, by the data processing system, a plurality of questions from the applicable playbook prior to determining a resolution to identify a possible resolution path for the one or more problems, resulting in an identified resolution path;
    receiving, by the data processing system, a plurality of answers to the plurality of questions from the user prior to determining the resolution;
    obtaining, by the data processing system, cross-domain information regarding one or more infrastructure devices potentially relevant to the one or more problems, resulting in obtained cross-domain information;
    cognitively determining, by the data processing system, one or more possible resolutions based on the plurality of answers and the obtained cross-domain information; and
    auto-remediating, by the data processing system, the one or more problems.

2. The computer-implemented method of claim 1, wherein the plurality of playbooks comprises a playbook selection guide for assisting the user with finding an applicable playbook.

3. The computer-implemented method of claim 2, wherein the active storage environment comprises at least one storage fabric, and wherein for the at least one storage fabric, the playbook selection guide comprises choices of a storage environment failure, a storage environment performance issue and at least one of a congested drain and a slow drain.

4. The computer-implemented method of claim 2, wherein the playbook selection guide comprises one or more resolution paths for at least one specific problem.

5. The computer-implemented method of claim 2, wherein the plurality of playbooks comprises one or more resolution paths that are general and lead to more specific paths.

6. The computer-implemented method of claim 1, wherein the plurality of playbooks comprises a playbook for checking basic operations of the active storage environment.

7. The computer-implemented method of claim 1, further comprising making available to the user a flow diagram of at least a portion of the identified resolution path.

8. The computer-implemented method of claim 1, wherein the obtaining comprises directly interfacing with the one or more infrastructure devices of the active storage environment.

9. The computer-implemented method of claim 1, wherein the active storage environment comprises at least one of a storage fabric and a storage system coupled to a storage fabric.

10. The computer-implemented method of claim 1, further comprising using machine learning to improve accuracy of the cognitively determining.

11. A system for finding, troubleshooting and auto-remediating problems in storage environments, the system comprising:
a memory; and
at least one processor in communication with the memory to perform a computer-implemented method of finding, troubleshooting and auto-remediating problems in storage environments, the method comprising:
guiding a user, by a data processing system of an active storage environment, to select an applicable playbook of troubleshooting logic from among a plurality of playbooks of different troubleshooting logic to address one or more problems with one or more infrastructure devices of the active storage environment;
asking the user, by the data processing system, a plurality of questions from the applicable playbook prior to determining a resolution to identify a possible resolution path for the one or more problems, resulting in an identified resolution path;
receiving, by the data processing system, a plurality of answers to the plurality of questions from the user prior to determining the resolution;
obtaining, by the data processing system, cross-domain information regarding one or more infrastructure devices potentially relevant to the one or more problems, resulting in obtained cross-domain information;
cognitively determining, by the data processing system, one or more possible resolutions based on the plurality of answers and the obtained cross-domain information; and
auto-remediating, by the data processing system, the one or more problems.

12. The system of claim 11, wherein the plurality of playbooks comprises a playbook selection guide for assisting the user with finding an applicable playbook.

13. The system of claim 12, wherein the active storage environment comprises at least one storage fabric, and wherein for the at least one storage fabric, the playbook selection guide comprises choices of a storage environment failure, a storage environment performance issue and at least one of a congested drain and a slow drain.

14. The system of claim 12, wherein the playbook selection guide comprises one or more first resolution paths for at least one specific problem and one or more second resolution paths that are general and lead to more specific paths.

15. The system of claim 11, wherein the obtaining comprises directly interfacing with the one or more infrastructure devices of the active storage environment.

16. A computer program product for finding, troubleshooting and auto-remediating problems in storage environments, the computer program product comprising:
a storage medium readable by a processor and storing instructions for performing a method of sending notifications, the method comprising:
guiding a user, by a data processing system of an active storage environment, to select an applicable playbook of troubleshooting logic from among a plurality of playbooks of different troubleshooting logic to address one or more problems with one or more infrastructure devices of the active storage environment;
asking the user, by the data processing system, a plurality of questions from the applicable playbook prior to determining a resolution to identify a possible resolution path for the one or more problems, resulting in an identified resolution path;
receiving, by the data processing system, a plurality of answers to the plurality of questions from the user prior to determining the resolution;
obtaining, by the data processing system, cross-domain information regarding one or more infrastructure devices potentially relevant to the one or more problems, resulting in obtained cross-domain information;
cognitively determining, by the data processing system, one or more possible resolutions based on the plurality of answers and the obtained cross-domain information; and
auto-remediating, by the data processing system, the one or more problems.

17. The computer program product of claim 16, wherein the plurality of playbooks comprises a playbook selection guide for assisting the user with finding an applicable playbook.

18. The computer program product of claim 17, wherein the active storage environment comprises at least one storage fabric, and wherein for the at least one storage fabric, the playbook selection guide comprises choices of a storage environment failure, a storage environment performance issue and at least one of a congested drain and a slow drain.

19. The computer program product of claim 17, wherein the playbook selection guide comprises one or more first resolution paths for at least one problem and one or more second resolution paths that are general and lead to more specific paths.

20. The computer program product of claim 16, wherein the obtaining comprises directly interfacing with the one or more infrastructure devices of the active storage environment.

* * * * *